United States Patent
Cao et al.

(10) Patent No.: US 11,799,843 B2
(45) Date of Patent: Oct. 24, 2023

(54) REVOCABLE LIGHTWEIGHT GROUP AUTHENTICATION METHOD AND SYSTEM FOR EDGE CONTROLLER, AND MEDIUM

(71) Applicant: Guangzhou University, Guangzhou (CN)

(72) Inventors: Zhong Cao, Guangzhou (CN); Zhuo Chen, Guangzhou (CN); Wenli Shang, Guangzhou (CN); Wenjing Zhao, Guangzhou (CN); Hai Jie, Guangzhou (CN); Sha Huan, Guangzhou (CN); Man Zhang, Guangzhou (CN)

(73) Assignee: GUANGZHOU UNIVERSITY, Guangzhou (CN)

( * ) Notice: Subject to any disclaimer, the term of this patent is extended or adjusted under 35 U.S.C. 154(b) by 0 days.

(21) Appl. No.: 18/048,104

(22) Filed: Oct. 20, 2022

(65) Prior Publication Data
US 2023/0130302 A1    Apr. 27, 2023

(30) Foreign Application Priority Data
Oct. 21, 2021   (CN) .......................... 202111225104.9

(51) Int. Cl.
H04L 9/40    (2022.01)
(52) U.S. Cl.
CPC ........ H04L 63/0823 (2013.01); H04L 63/062 (2013.01)

(58) Field of Classification Search
None
See application file for complete search history.

(56) References Cited

U.S. PATENT DOCUMENTS

| | | | |
|---|---|---|---|
| 2019/0312734 A1* | 10/2019 | Wentz | H04L 9/0877 |
| 2019/0319964 A1* | 10/2019 | Smith | H04L 69/22 |
| 2022/0141041 A1* | 5/2022 | Parikh | H04L 9/3066 |
| | | | 713/156 |

* cited by examiner

Primary Examiner — Brandon Hoffman
(74) Attorney, Agent, or Firm — Getech Law LLC; Jun Ye

(57) ABSTRACT

A revocable lightweight group authentication method and system for an edge controller is described here. When the edge controller needs to be registered, an edge server generates a private key of the edge controller and sends the private key to the edge controller, and meanwhile adds the edge controller to a group list of the edge server; the edge server updates a certificate of the edge controller, adds the certificate to a certificate list of the edge server and sends the certificate to the edge controller so that the edge controller updates the private key according to the updated certificate; and then the edge controller generates a signature according to the updated private key, and sends the signature to the edge server so that the edge server authenticates the edge controller after determining that the signature meets preset requirements.

7 Claims, 1 Drawing Sheet

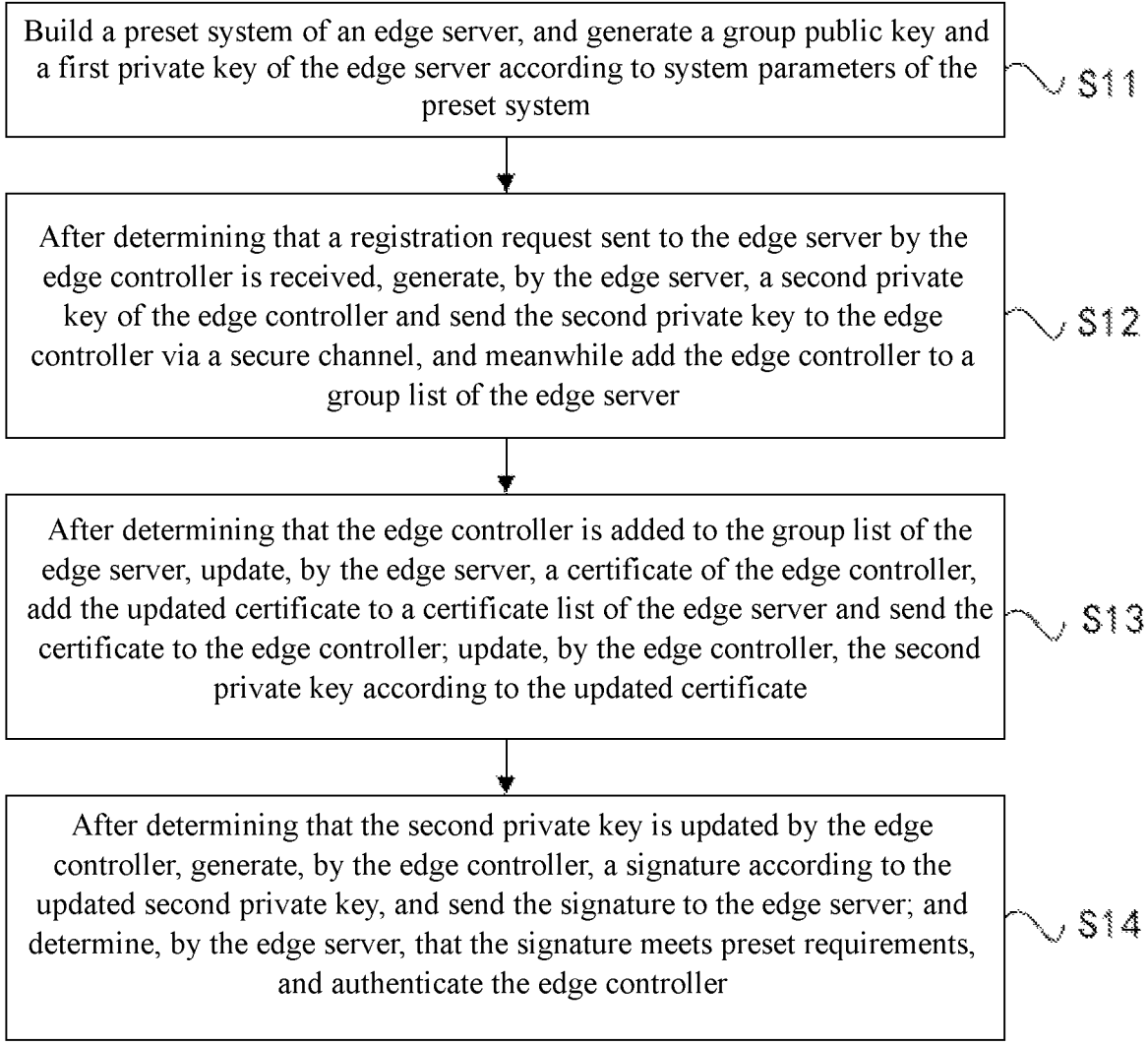

REVOCABLE LIGHTWEIGHT GROUP AUTHENTICATION METHOD AND SYSTEM FOR EDGE CONTROLLER, AND MEDIUM

TECHNICAL FIELD

The present invention relates to the field of industrial Internet information security, in particular to a revocable lightweight group authentication method and system for an edge controller, and a medium.

BACKGROUND

Among the related technologies, the industrial Internet provides access to the development and progress of industrial digitalization, networking and intelligence, and is an important foundation for the fourth industrial revolution. The cloud computing-centered traditional model is commonly taken in the industrial field, in which data is stored, managed, analyzed and mined in a centralized manner by virtue of effectively integrating various system resources. However, in the face of the booming of network edge data, the traditional cloud-computing mode presents obvious deficiencies, specifically including high bandwidth demand, great energy demand, insufficient real-time performance, and difficulty to guarantee security and privacy during data transmission and storage.

For making up for the deficiencies of the cloud-computing model, the edge computing comes into being. The edge computing refers to computing at the network edge, with the advantages of high reliability, low delay and capability to meet the requirements for building the future industrial network. In the field of industrial control, more and more intelligent sensors and actuators with computing power are applied to industrial control systems, thus producing massive data to improve control technology, optimize production process, and increase productivity. The current industrial programmable logic controller (PLC) cannot perform edge computing that requires high local data processing capacity. Therefore, an edge computing-based intelligent controller (edge controller for short) is born for edge computing requirements. The edge controller may be integrated with the PLC, gateway, motion control, I/O data acquisition, field bus protocol, machine vision, equipment networking and other multi-field functions, while realizing equipment motion control, data acquisition, computing, and connection to the edge server for intelligent production line control. Obviously, the edge controller has been a core component in the edge computing, of which the secure and credible operation has important significance and impact on the promotion and development of the edge computing. However, the current targeted secure and credible operation mechanism is not applicable to the edge controller technologies, and thus cannot improve the security and credibility of the edge controller.

SUMMARY

The present invention is intended to solve one of technical problems in the prior art. For this, the present invention provides a revocable lightweight group authentication method and system for an edge controller, and a medium, which can effectively improve the security and credibility of the edge controller.

In the first aspect, an embodiment of the present invention provides a revocable lightweight group authentication method for an edge controller, including the steps of:

building a preset system of an edge server, and generating a group public key and a first private key of the edge server according to system parameters of the preset system;

after determining that a registration request sent to the edge server by the edge controller is received, generating, by the edge server, a second private key of the edge controller and sending the second private key to the edge controller via a secure channel, and meanwhile adding the edge controller to a group list of the edge server;

after determining that the edge controller is added to the group list of the edge server, updating, by the edge server, a certificate of the edge controller, adding the updated certificate to a certificate list of the edge server and sending the certificate to the edge controller; updating, by the edge controller, the second private key according to the updated certificate; and after determining that the second private key is updated by the edge controller, generating, by the edge controller, a signature according to the updated second private key, and sending the signature to the edge server; and determining, by the edge server, that the signature meets preset requirements, and authenticating the edge controller.

In some embodiments, the method further including:

when determining that the edge server needs to check a real identity of the edge controller, tracing, by the edge server, the edge controller via the signature, and checking the real identity of the edge controller, and when determining that the edge server needs to revoke the edge controller, not sending the updated certificate to the edge controller by the edge server.

In some embodiments, the step of building the preset system of the edge server includes:

determining, for the edge server, a first multiplicative cyclic group, a second multiplicative cyclic group and a third multiplicative cyclic group with a selection order of a big prime, and determining a first generator of the first multiplicative cyclic group and a second generator of the second multiplicative cyclic group;

determining an isomorphic mapping of the first multiplicative cyclic group and the second multiplicative cyclic group, and determining first functions of the first generator and the second generator according to the isomorphic mapping;

determining bilinear pairings of the first multiplicative cyclic group, the second multiplicative cyclic group and the third multiplicative cyclic group;

obtaining a first hash function and a second hash function, wherein the second hash function is correlative to the first multiplicative cyclic group;

extracting a first element of a first set and a second element of the first multiplicative cyclic group, wherein the first set is correlative to the first hash function, and a first exponent of the second element with respect to the first element is equal to a preset value;

extracting a third element of the first set, and determining a second exponent of the second generator with respect to the third element;

obtaining a first time period, calculating a second hash function value of the first time period, and calculating a product of the second hash function value and the first generator; and generating a group public key according to the product, the second generator, the second element, the preset value and the second exponent; and generating a private key of the edge server according to the first element.

In some embodiments, the step of generating, by the edge server, the second private key of the edge controller, sending the second private key to the edge controller via the secure channel, and meanwhile adding the edge controller to the group list of the edge server comprises:

extracting a fourth element of the first set, and calculating a third exponent of the first generator with respect to the third element and the fourth element; and generating a second private key of the edge controller according to the fourth element and the third exponent, sending the second private key to the edge controller via the secure channel, and meanwhile adding the edge controller to the group list of the edge server.

In some embodiments, the step of updating, by the edge server, the certificate of the edge controller, and adding the updated certificate to the certificate list of the edge server includes:

calculating a fourth exponent of the second hash function value with respect to the third element and the fourth element, and updating the certificate of the edge controller according to the fourth exponent; and adding the updated certificate to the certificate list of the edge server.

In some embodiments, the step of generating, by the edge controller, the signature according to the updated second private key, and sending the signature to the edge server; and determining, by the edge server, that the signature meets the preset requirements, and authenticating the edge controller includes:

determining, by the edge controller, a first message according to the updated second private key, calculating a first challenge value according to the first message, outputting a signature of the first message, and sending the signature to the edge server; and calculating, by the edge server, a second challenge value, determining that the first challenge value is equal to the second challenge value, receiving the signature, and authenticating the edge controller.

In some embodiments, the step of tracing, by the edge server, the edge controller via the signature and checking the real identity of the edge controller includes:

determining, by the edge server, the signature as a valid signature for the first message, calculating the second private key of the signature corresponding to the edge controller; and checking information about the edge controller in the certificate list and the group list according to the second private key.

In some embodiments, the method further including:

when determining that the edge server needs to revoke the edge controller, deleting all information about the edge controller from the certificate list and the group list.

In the second aspect, an embodiment of the present invention provides a revocable lightweight group authentication system for an edge controller, including:

at least one memory, configured to store a program; and
at least one processor, configured to load the program to execute the revocable lightweight group authentication method for the edge controller.

In the third aspect, an embodiment of the present invention provides a storage medium having a program executable by a computer stored thereon, wherein when being executed by the processor, the program executable by the computer is configured to implement the revocable lightweight group authentication method for the edge controller.

The revocable lightweight group authentication method for the edge controller according to the embodiment of the present invention has the following benefits:

when the group public key of the preset system of the edge server and the private key of the edge server are generated and the edge controller needs to be registered according to the embodiment, the edge server generates the private key of the edge controller and sends the private key of the edge controller to the edge controller, and meanwhile adds the edge controller to the group list of the edge server; the edge server updates the certificate list of the edge controller, adds the updated certificate to the certificate list of the edge server and sends the certificate to the edge controller so that the edge controller updates the private key thereof according to the updated certificate; and then the edge controller generates a signature according to the updated private key, and sends the signature to the edge server so that the edge server authenticates the edge controller after determining that the signature meets preset requirements. The embodiment can improve the security and credibility when the edge controller is added into the edge server and works at the edge server by means of generating and updating the private key and the certificate while the edge controller is bound to the edge server.

The additional aspects and advantages of the present invention will be set forth in the description which follows, and in part will be obvious from the description, or learned by the practice of the present invention.

BRIEF DESCRIPTION OF DRAWINGS

The present invention will be further depicted with reference to the accompanying drawings and embodiments, wherein:

FIG. 1 is a flow chart of a revocable lightweight group authentication method for an edge controller according to an embodiment of the present invention.

DETAILED DESCRIPTION OF EMBODIMENTS

The embodiments of the present invention will be described in details in the following paragraphs. Examples of the embodiments are shown in the accompanying drawings, in which like or similar numbers refer to like or similar elements or elements with like or similar functions throughout. The embodiments depicted with reference to the accompanying drawings below are exemplary, and are merely intended for the purpose of explanation, but are not to be construed as limiting of the present invention.

In the description of the present invention, "a number of" means more than one, "a plurality of" means more than two, "greater than", "smaller than", "over" and so on are constructed as not including the original number, and "above", "below" and "within" and the like are constructed as including the original number. "First" and "second" (if any) are merely for distinguishing the technical features, but are not to be construed as indicating or implying the relative importance or implicitly indicating the number of technical features indicated or implicitly indicating the precedence relationship of technical features indicated.

In the description of the present invention, the words such as "provide" should be understood in a broad sense, and those skilled in the art may reasonably determine the specific meanings of the foregoing words in the present invention with reference to the details of the technical solution, unless otherwise expressly defined.

In the description of the present invention, the reference terms "one embodiment", "some embodiments", "exemplary embodiments", "examples", "specific examples", or "some examples" refer to that the specific features or characteristics described with reference to such embodiment or example are included into at least one embodiment or example of the present invention. In the specification, indicative expressions of the above terms do not necessarily refer to the same embodiments or examples. Moreover, the described specific features or characteristics may be combined in any one or more embodiments or examples in a proper manner.

The edge controllers are numerous and diverse, and software and hardware resources of a plurality of equipment are limited, and moreover the current security and credibility operation mechanism is not applicable to the operation process of the edge controller and the edge server. Therefore, the embodiment provides the revocable lightweight group authentication method and system for the edge controller, and the medium, which support that the edge server may trace the real identity of the edge controller, and meanwhile ensure a third party cannot know the identity privacy of the edge controller except the edge server. According to the embodiment, based on an updating mechanism for the private key and the certificate, the edge controller is revocable efficiently, and the revoked edge controller cannot access or upload data to the edge server, protect important data and sensitive information in industrial Internet scenarios.

Particularly, by referring to FIG. 1, an embodiment of the present invention provides a revocable lightweight group authentication method for an edge controller, including the steps of:

S11. building a preset system of an edge server, and generating a group public key and a first private key of the edge server according to system parameters of the preset system.

In the embodiment, the system parameters of the preset system are generated by the edge server, and the group public key and the private key of the edge server are generated according to the system parameter, wherein the private key of the edge server is taken as the first private key. Particularly, the preset system building process may be implemented by the following steps:

determining, for the edge server, a first multiplicative cyclic group $G_1$, a second multiplicative cyclic group $G_2$ and a third multiplicative cyclic group $G_T$ with a selection order of a big prime p, and determining a first generator $g_1$ of the first multiplicative cyclic group $G_1$ and a second generator $g_2$ of the second multiplicative cyclic group $G_2$; determining an isomorphic mapping $\psi: G_2 \text{-} G_1$ of the first multiplicative cyclic group $G_1$ and the second multiplicative cyclic group $G_2$, and determining a first function $g_1 = \psi(g_2)$ of the first generator $g_1$ and the second generator $g_2$ based on the isomorphic mapping $\psi: G_2 \to G_1$, and determining a bilinear pairing $e: G_1 \times G_2 \to G_T$ of the first multiplicative cyclic group $G_1$, the second multiplicative cyclic group $G_2$ and the third multiplicative cyclic group $G_T$, obtaining two safe and collision-resistant hash functions, wherein a first hash function is $H_1: \{0,1\}^* \to Z^*_p$, and a second hash function is $H_2: \{0,1\}^* \to G_1$;

and then extracting first elements $\xi_1$ and $\xi_2$ of a first set Z and second elements u and v of the first multiplicative cyclic group $G_1$, wherein the first set Z is correlative to the first hash function, and a first exponent of the second element with respect to the first element is equal to a preset value h, for example, randomly selecting $h \in G_1 \backslash \{1_{G_1}\}$, and selecting $t\xi_1, \xi_2 \in Z^*_p$ and $u, v \in G_1$ so that $u^{\xi_1} = v^{\xi_2} = h$; and meanwhile extracting a third element $\gamma$ of the first set $Z^*_p$, and determining a second exponent w of the second generator with respect to the third element $\gamma$, for example, randomly selecting $\gamma \in Z^*_p$, and making $w = g_2^\gamma$, wherein it should be noted that the edge server is only allowed to know $\gamma$ in the embodiment;

obtaining a first time period, calculating a second hash function value of the first time period, and calculating a product of the second hash function value and the first generator, for example, selecting the time period $T_j$ (j=1,2,3 . . . ) as the first time period, and calculating $R_j = H_2(T_j)$ as the second hash function value, and calculating $g_1' = g_1 \cdot R_j$ as a product of the second hash function value and the first generator; and then generating a group public key according to the product $g_1'$, the second generator $g_2$, the second elements u and v, the preset value h and the second exponent w; and generating the private key of the edge server according to the first elements $\xi_1$ and $\xi_2$, for example, obtaining the group public key by virtue of the calculation of $gpk = (g_1', g_2, u, v, h, w)$, and obtaining the private key of the edge server by virtue of the calculation of $gmsk = (\xi_1, \xi_2)$.

S12. after determining that a registration request sent to the edge server by the edge controller is received, generating, by the edge server, a second private key of the edge controller and sending the second private key to the edge controller via a secure channel, and meanwhile adding the edge controller to a group list of the edge server.

In the embodiment, when the edge controller with an ID identifier of $ID_i$ (i=1,2,3 . . . ) is expectedly added into group members of the edge server, the edge controller sends the registration request to the edge server, and then the edge server generates the private key of the edge controller after receiving the registration request, and returns the private key to the edge controller, and meanwhile adds the edge controller to the group list of the edge server. In the step, the private key of the edge controller is taken as the second private key. Particularly, the step of generating the second private key of the edge controller by the edge server, and adding the edge controller to the group list of the edge server may be implemented by the following methods:

extracting a fourth element $x_i$ of the first set $Z^*_p$, wherein $x \in Z^*_p$, and calculating a third exponent $A_i$ of the first generator $g_1$ with respect to the third element $\gamma$ and the fourth element $x_i$, where $$A_i = g_1^{\frac{1}{\gamma + x_i}} \in G_1;$$

and then generating the private key $gsk[i] = (A_i, x_i)$ of the edge controller as the second private key according to the fourth element $x_i$ and the third exponent $A_i$, sending the second private key to the edge controller with the ID identifier as $ID_i$, via the secure channel, and meanwhile adding the edge controller with the ID identifier as $ID_i$, into the group list of the edge server.

S13. after determining that the edge controller is added to the group list of the edge server, updating, by the edge server, a certificate of the edge controller, adding the updated certificate to a certificate list of the edge server and sending the certificate to the edge controller, updating, by the edge controller, the second private key according to the updated certificate.

In the embodiment, the step of updating and adding the certificate of the edge controller to the certificate list may be implemented by the following methods:

calculating a fourth exponent $rcert_j$ of the second hash function value $R_j$ with respect to the third element $\gamma$ and the fourth element $x_i$, where, $$rcert_j = R_j^{\frac{1}{\gamma + x_i}},$$

updating the certificate of the edge controller according to the fourth exponent $rcert_j$, and adding the updated certificate $(A_i',T_j,rcert_j)$ to the certificate list of the edge server, where, $A_i'=A_i \cdot rcert_j$, for example, in the time period $T_j$, the edge controller i obtains the updated private key thereof, and then the edge server calculates the updated certificate $$rcertj = R_j^{\frac{1}{\gamma + x_i}},$$

and adds $(A_i',T_j,rcert_j)$ to the certificate list C-list;

and then the edge server sends the updated certificate $rcert_j$ to the edge controller i, the edge controller i calculates $R_j=H_2(T_j)$, and verifies whether an equation $e(rcert_j, w \cdot g_2^{x_j}=e(R_j,g_2)$ is established; if the equation is established, the edge controller i updates the private key thereof as $gsk[i]'=(A_i',x_i)$, where $A_i'=A_i \cdot rcert_j$; and if the equation is not established, the edge controller i cannot update the private key thereof.

S14. after determining that the second private key is updated by the edge controller, generating, by the edge controller, a signature according to the updated second private key, and sending the signature to the edge server; and determining, by the edge server, that the signature meets preset requirements, and authenticating the edge controller.

In the embodiment, the edge controller determines the first message $M \in \{0,1\}^*$ according to the updated second private key, calculates a first challenge value $c=H_1(M,T_1,T_2,T_3,R_1,R_2,R_3)$ according to the first message $M \in \{0,1\}^*$, outputs a signature of the first message $\sigma=(T_1, T_2, T_3,c,s_{\alpha\beta},s_{xi},s_{\delta 1},s_{\delta 2})$, and sends the signature $\sigma=(T_1, T_2, T_3,c,s_{\alpha\beta},s_{xi},s_{\delta 1},s_{\delta 2})$ to the edge server; and then the edge server calculates a second challenge value $c'=H_1(M,T_1,T_2,T_3,R_1',R_2',R_3')$, determines that the first challenge value $c=H_1(M,T_1,T_2,T_3,R_1,R_2,R_3)$ is equal to the second challenge value $c'=H_1(M,T_1,T_2,T_3,R_1',R_2',R_3')$, receives the signature, and authenticates the edge controller.

Particularly, in the time period $T_j$, for the edge controller with the group member private key as $gsk[i]'=(A_i,x_i)$, a signature algorithm performs the following steps:

selecting the message $M \in (0,1)^*$;
randomly selecting $\alpha, \beta \in Z_p^*$, and calculating $\delta_1=x_i\alpha$, $\delta_2=x_i\beta$, $T_1=u^\alpha$, $T_2=u^\beta$, $T_3=A_i'h^{\alpha+\beta}$;
randomly selecting a blinding factor $r_\alpha$, $r_\beta$, $r_{xi}$, $r_{\delta 1}$, $r_{\delta 2} \in Z^*_p$, and calculating $R_1=e(T_3, g_2)^{r_{xi}} \cdot e(h,w)^{-r_\alpha \cdot \beta} \cdot e(h, g_2)^{-r_{\delta 1} - r_{\delta 2}}$, $$R_2 = T_1^{r_{xi}} \cdot u^{-r_{\delta 1}}$$

and $$R_3 = T_2^{r_{xi}} \cdot v^{-r_{\delta 2}};$$

and then calculating the challenge value $c=H_1(M,T_1,T_2,T_3,R_1,R_2,R_3)$;
calculating: $s_{\alpha\beta}=r_\alpha+r_\beta+(\alpha+\beta)$, $s_{x_i}=r_{x_i}+cx_i, s_{\delta_1}=r_{\delta_1}+c\delta_1$, $s_{\delta_2}=r_{\delta_2}+c\delta_2$; and finally outputting the message M as $\sigma=(T_1,T_2,T_3,c,s_{\alpha\beta},s_{xi},s_{\delta 1},s_{\delta 2})$, and sending the signature a to the edge server.

In the time period $T_j$, the process of verifying, by the edge server, the signature $\sigma=(T_1,T_2,T_3,c,s_{\alpha\beta},s_{xi},s_{\delta 1},s_{\delta 2})$ of the message M is as follows: calculating $R_1'$, $R_2'$ and $R_3'$, where $R_1'=e(T_3, g_2)^{s_{xi}} \cdot e(h, w)^{-s_{\alpha\beta}} \cdot e(h,g_2)^{-s_{\delta 1}-s_{\delta 2}}$, $$R_2' = T_1^{s_{xi}} \cdot u^{-s_{\delta 1}}$$

and $$R_3' = T_2^{s_{xi}} \cdot v^{-s_{\delta 2}};$$

and determining whether $c'=H(M,T_1,T_2,T_3,R_1',R_2',R_3')$ is equal to c; if yes, receiving the signature and passing the authentication; and otherwise, rejecting the signature and the access.

In some embodiments, the edge server may also check and revoke the information about the edge controller after authenticating and accessing the edge controller.

Particularly, the edge server traces the edge controller by virtue of tracing the signature and checks the real identity of the edge controller when determining that the edge server needs to check the real identity of the edge controller. It will be appreciated that the edge server determines the signature as the valid signature for the first message, calculates the second private key of the signature corresponding to the edge controller, and checks the information about the edge controller in the certificate list and the group list according to the second private key.

When determining that the edge server needs to revoke the edge controller, the edge server does not send the updated certificate to the edge controller, and meanwhile deletes all information about the edge controller in the certificate list and the group list, thus efficiently revoking the group members.

For example, when supposing that the message M sent by a certain edge controller gives errors frequently or detecting that a certain edge controller is invaded maliciously, the edge server may trace the edge controller by virtue of opening the signature, thus revoking the edge controller.

Particularly, the step of opening, by the edge server, the signature $\sigma=(T_1,T_2,T_3,c,s_{\alpha\beta},s_{xi},s_{\delta 1},s_{\delta 2})$ of the message M by virtue of the private key $gmsk=(\xi_1, \xi_2)$ includes the following processes:

verifying whether the signature a is the valid signature of the message M; if yes, performing a next step; and otherwise, terminating;
calculating $A'_i=T_3/(T_1^{\xi_1} \cdot T_2^{\xi_2})$, for the valid edge controller i in the time period $T_j$, checking $rcert_j$ in the certificate list C-list, and then calculating $$A'_i = \frac{A'_i}{rcert_j};$$

and looking for $A_i$ in the member list M-list, and checking the ID identifier $ID_i$ of the edge controller to know the real identity of the edge controller.

In order to revoke the edge controller i with the ID identifier $ID_i$, the edge server no longer provides the updated certificate $rcert_j$, and deletes all information about the edge controller from the certificate list C-list and the member list M-list, thus effectively revoking the group members.

In conclusion, the embodiment has an efficient authentication efficiency, supports the edge server to trace the real identity of the edge controller, and meanwhile ensures that the identity privacy of the edge controller cannot be known by any third party other than the edge server. Meanwhile, based on an updating mechanism for the private key and the certificate in which the edge controller is revocable efficiently, the revoked edge controller cannot access or upload data to the edge server, thus protecting important data and sensitive information in industrial Internet scenarios.

An embodiment of the present invention provides a revocable lightweight group authentication system for an edge controller, including:

at least one memory, configured to store a program; and
at least one processor, configured to load the program to execute the revocable lightweight group authentication method for the edge controller as shown in FIG. 1.

The method embodiment according to the present invention is applicable to the system embodiment, the system embodiment particularly implements the same functions as the foregoing method embodiment, and reaches the same beneficial effects as the foregoing method.

An embodiment of the present invention provides a storage medium having a program executable by a computer stored thereon, wherein when being executed by the processor, the program executable by the computer is configured to implement the revocable lightweight group authentication method for the edge controller as shown in FIG. 1. In addition, an embodiment of the present invention further provides a computer program product or a computer program, wherein the computer program product or the computer programs includes a computer instruction which is stored in a computer readable medium. The processor of computer equipment may read the computer instruction from the computer readable medium, and the processor executes the computer instruction so that the computer equipment executes the revocable lightweight group authentication method for the edge controller as shown in FIG. 1.

As mentioned above, the embodiments of the present invention are elaborated with reference to the accompanying drawings, but the present invention is not limited to the foregoing embodiments, and may be varied without deviating from the spirit of the present invention within the knowledge of those of ordinary skill in the art. In addition, the embodiments according to the present invention and the features therein can be combined at will so long as there is no conflict.

The invention claimed is:

1. A revocable lightweight group authentication method for an edge controller, comprising:

building a preset system of an edge server, and generating a group public key and a first private key of the edge server according to system parameters of the preset system;

after determining that a registration request sent to the edge server by the edge controller is received, generating, by the edge server, a second private key of the edge controller and sending the second private key to the edge controller via a secure channel, and meanwhile adding the edge controller to a group list of the edge server;

after determining that the edge controller is added to the group list of the edge server, updating, by the edge server, a certificate of the edge controller, adding the updated certificate to a certificate list of the edge server and sending the certificate to the edge controller; updating, by the edge controller, the second private key according to the updated certificate; and after determining that the second private key is updated by the edge controller, generating, by the edge controller, a signature according to the updated second private key, and sending the signature to the edge server; and determining, by the edge server, that the signature meets preset requirements, and authenticating the edge controller, wherein the step of building the preset system of the edge server comprises:

determining, for the edge server, a first multiplicative cyclic group, a second multiplicative cyclic group and a third multiplicative cyclic group with a selection order of a big prime, and determining a first generator of the first multiplicative cyclic group and a second generator of the second multiplicative cyclic group;

determining an isomorphic mapping of the first multiplicative cyclic group and the second multiplicative cyclic group, and determining first functions of the first generator and the second generator according to the isomorphic mapping;

determining bilinear pairings of the first multiplicative cyclic group, the second multiplicative cyclic group and the third multiplicative cyclic group;

obtaining a first hash function and a second hash function, wherein the second hash function is correlative to the first multiplicative cyclic group;

extracting a first element of a first set and a second element of the first multiplicative cyclic group, wherein the first set is correlative to the first hash function, and a first exponent of the second element with respect to the first element is equal to a preset value;

extracting a third element of the first set, and determining a second exponent of the second generator with respect to the third element;

obtaining a first time period, calculating a second hash function value of the first time period, and calculating a product of the second hash function value and the first generator; and generating a group public key according to the product, the second generator, the second element, the preset value and the second exponent; and generating a private key of the edge server according to the first element.

2. The revocable lightweight group authentication method for the edge controller of claim 1, the method further comprising:

when determining that the edge server needs to check a real identity of the edge controller, tracing, by the edge server, the edge controller via the signature, and checking the real identity of the edge controller; and when determining that the edge server needs to revoke the edge controller, not sending the updated certificate to the edge controller by the edge server.

3. The revocable lightweight group authentication method for the edge controller of claim 1, wherein the step of generating, by the edge server, the second private key of the edge controller and sending the second private key to the edge controller via the secure channel, and meanwhile adding the edge controller to the group list of the edge server comprises:

extracting a fourth element of the first set, and calculating a third exponent of the first generator with respect to the third element and the fourth element; and generating a second private key of the edge controller according to the fourth element and the third exponent, sending the second private key to the edge controller via the secure channel, and meanwhile adding the edge controller to the group list of the edge server.

4. The revocable lightweight group authentication method for the edge controller of claim 3, wherein the step of updating, by the edge server, the certificate of the edge controller, and adding the updated certificate to the certificate list of the edge server comprises:

calculating a fourth exponent of the second hash function value with respect to the third element and the fourth element, and updating the certificate of the edge controller according to the fourth exponent; and adding the updated certificate to the certificate list of the edge server.

5. The revocable lightweight group authentication method for the edge controller of claim 4, wherein the step of generating, by the edge controller, the signature according to the updated second private key, and sending the signature to the edge server; and determining, by the edge server, that the signature meets preset requirements, and authenticating the edge controller comprises:

determining, by the edge controller, a first message according to the updated second private key, calculating a first challenge value according to the first message, outputting a signature of the first message, and sending the signature to the edge server, and calculating, by the edge server, a second challenge value, determining that the first challenge value is equal to the second challenge value, receiving the signature, and authenticating the edge controller.

6. The revocable lightweight group authentication method for the edge controller of claim 5, wherein the step of tracing, by the edge server, the edge controller via the signature and checking the real identity of the edge controller comprises:

determining, by the edge server, the signature as a valid signature for the first message, calculating the second private key of the signature corresponding to the edge controller;

and checking information about the edge controller in the certificate list and the group list according to the second private key.

7. The revocable lightweight group authentication method for the edge controller of claim 2, the method further comprising:

when determining that the edge server needs to revoke the edge controller, deleting all information about the edge controller from the certificate list and the group list.

* * * * *